Fig. 1

Carbide

Fig. 2A

Ni Ti Alloy

Graphite Threads

INVENTOR
Edward E. Hucke

ATTORNEYS

United States Patent Office 3,235,346
Patented Feb. 15, 1966

3,235,346
COMPOSITE BODIES COMPRISING A CONTINUOUS FRAMEWORK AND AN IMPREGNATED METALLIC MATERIAL AND METHODS OF THEIR PRODUCTION
Edward E. Hucke, Ann Arbor, Mich., assignor, by mesne asignments, to Valley Company, Inc., Atchison, Kans., a corporation of Kansas
Filed Nov. 22, 1960, Ser. No. 71,071
20 Claims. (Cl. 29—190)

My present invention and discoveries relates to improved articles of relatively high hardness, and to improved articles embodying constituents or components of realtively high hardness, and to their methods of manufacture. As hereinafter referred to, my improved articles are composed substantially entirely or partially of materials of relatively high hardness.

More particularly my invention and discoveries relate to improved articles formed from combination of elements having non-metallic properties such as carbon in its three known states boron, silicon and the like which combine with metals to form compositions that are too hard to form by usual metal machining operations and have melting points so high that their formation by casting is impractical and in some cases impossible. The best known and most widely used of such compositions are the metallic carbide phases. Others such as the boride and silicide phases are not so well known nor used, but have interesting possibilities as articles of manufacture when produced in accordance with my invention. Therefore, the following description of my invention and discoveries will be primarily devoted to my improved process and carbide articles produced thereby.

Many of the elements in the periodic table form very stable metallic carbide phases. The best examples are the carbides of beryllium, boron, silicon, titanium, vanadium, chromium, manganese, iron, zirconium, niobium, molybdenum, hafnium, tantalum, tungsten, thorium, plutonium and uranim. Certain of these, such as tungsten carbide, titanium carbide, and silicon carbide have found wide use in engineering applications of all kinds due to their extreme hardness. Others of the group, such as the carbides of uranium, zirconium, thorium, and plutonium have very interesting nuclear properties which might lead to their utilization as nuclear device components. Many show promise in applications involving corrosion resistance and high strength at elevated temperatures. All of these carbides possess a very high melting point, most of them well in excess of 2000° C.

It is paradoxical that the high melting point which is the basis for many of their most interesting properties is also a major factor which tends to defeat efforts to fabricate these materials into useful shapes. Their fabrication has in almost all cases been by powder metallurgy. The sintering operation characteristic of powder metallurgical processes, must be carried out close to the melting point. Since this temperature is in most cases above 2000° C., very few applications have been made where a carbide body is sintered without the use of a lower melting point binder material. The composite structures, composed of a cementing metallic phase which binds one or more carbide phases have been given the name "cemented carbides" or sometimes "hard metals," and belong to the general class called cermets.

The most popular of these cemented carbides utilize one of the iron group metals, such as cobalt or nickel to bind particles of tungsten or titanium carbide. In recent years a large technology has grown up around the methods possible for making cemented carbide bodies. An excellent review of the literature in this field is contained in the book "Treaties on Powder Metallurgy," vol. II, C. G. Goetzel, Interscience, 1950.

All powder metallurgical processes involve at least the following steps. (1) There must be the preparation of the finely powdered carbide and binding metal. (2) The materials must be intimately mixed such as by ball milling. (3) The mixture must be pressed into a "green compact" with pressures of the order of 5–20 tons per square inch. (4) Consolidation of the "green compact" is brought about by the mechanism of sintering, which requires a high temperature, controlled atmosphere heat treatment. In order to achieve desirable results rather close control must be maintained in all of these steps.

Sintering, which involves the closing of the internal voids left after the initial pressing, is very markedly accelerated by the presence of a liquid phase. It is for this reason that sintering of cemented carbides is normally carried out above the melting point of a particular binder metal which has been selected. Due to the extreme hardness of the cemented carbides, fabrication into finished shapes is feasible only before the final sintering operation. In the green state machining can be accomplished without undue difficulties. However, after final sintering the only methods available for shaping the object are extremely tedious and costly.

The production of the carbide articles, either with or without a metallic binder, by the ordinary processes of powder metallurgy imposes severe limitations. First the cost involved is necessarily high since preparation of extremely fine particulate matter with controlled properties is at best an expensive procedure. The milling, pressing, and sintering necessarily involve extensive time and expensive equipment. The pressing step, due to the high pressure required poses a severe limitation on the practical size to which cemented carbides can be made by powder metallurgical methods. This is due to the extreme size of the presses and tooling required to adequately consolidate compacts of greater than several square inches in cross section. In addition the pressing operation involves limitations on shape. Only rather simple shapes are possible. More complicated shapes require the production of expensive multi-action dies with inserts in order to achieve uniform pressed density and to allow removal of the green compact. Tolerance of the finished piece is also a problem since any non-uniformity which exists in the green compact will cause non-uniform shrinkage during sintering and hence cause variation in the dimensions of the piece. The linear shrinkage during final sintering is often 15% or more. Non-uniformity due to segregation in the compacts, as well as grain growth during sintering often cause undesirable microstructures to occur from point to point in the finished product. The final microstructure often involves one to five percent porosity, which detracts from the desirable properties of the final product.

My process involves the novel feature of infiltration with a liquid metallic alloy that is purposely chosen such that one of the constituents will chemically react with the carbonaceous mass yielding a desired metallic carbide as a product of the reaction. Infiltration as a means of making a cemented carbide is in itself not new. There are indeed many patents in this field. However, the prior patents in this field involve the infiltration of prepared metallic or carbide skeletons with metals of a lower melting point. These systems seek whenever possible to minimize any possible reaction occurring between the infiltering alloy and the skeleton. The carbide is always originally present as the skeleton and therefore does not form by reaction during or after infiltration. A good summary of these patents is contained in vol. III, Treatise on Powder Metallurgy by Goetzel.

U.S. Patent 2,597,964, issued to Lester L. Winter, May 27, 1952, discloses a method of making carbide articles by dipping a carbon skeleton into a solution of the metal in acid, or an acid or solution of a salt of the metal, and subsequently heating the impregnated skeleton to obtain a chemical reaction between the carbon skeleton and the solution. The reaction is of the type that changes the valence state of the metal and evolves a gaseous reaction product, which must escape the article through interconnecting pores. Next in a method step which is completely obviated by the present invention, Winter introduces silaceous material via the interconnecting pores in his reacted skeleton to obtain a fluid impervious article.

Further, Winter's process is limited to the formation of very minor amounts of carbide unless a plurality of repeated impregnation and reaction cycles are used as distinguished from my present invention whereby an article substantially all of which is carbide may be readily formed.

In U.S. Patent 2,098,062, issued November 2, 1937, to R. Palmer the surface of an almost solid piece of carbon is infiltered with an alloy that wets the carbon. In this case, if any reaction occurs, it is limited to a superficial wetting. The patent is directed at a method of joining or bonding metal to carbon or carbon to carbon and there is no attempt to form a carbide in heat treatment.

My process has the advantages of producing metallic carbide articles in almost unlimited shapes without using the techniques of powder metallurgy. In the preferred embodiment I produce such articles by infiltration of carbonaceous framework i.e., carbonaceous bodies having interstitially connected pores, such as porous carbon skeletons and the like described in detail hereinafter, with molten metallic material. Thereafter, or during infiltration the infiltered body is subjected to conditions sufficient to cause chemical reaction between the carbon and at least one element of the molten metallic material while the body as a whole maintains its integrity. This process need in no way be limited by any of the fundamental weak points of a powder metallurgical process. My process makes it possible to achieve a degree of uniformity and a versatility never before possible in the fabrication of carbide bodies.

A wide variety of useful products may be produced by my invention depending upon the materials and the specific manner of processing used. For example these products include non-porous carbonaceous cores of various shapes encased in very hard carbide coatings; carbonaceous porous bodies the outer surfaces of which are impregnated to a substantial depth with metallic carbide forming material, finished to desired shapes and then heat treated to form pore free outer layers with inner porous structure; carbonaceous bodies having the pores thereof substantially filled with metallic material, shaped to desired external form and then heat treated to form very hard solid pore free carbide; and variations thereof. Carbide formation in or on a preformed carbonaceous framework may also be carried out simultaneously with impregnation or coating. Similarly, such varieties of novel products may be formed from other base framework materials having non-metallic properties as for example from boron and silicon treated with a coating or impregnation of molten metal material.

Accordingly, it is a primary object of my present invention and discoveries to provide a novel process of making articles in a wide variety of shapes embodying hard reaction products of components or constituents having non-metallic properties and those having metallic properties.

Another object is to provide a process for making a substantially pore free carbide article by infiltering a porous carbonaceous framework with a molten metallic liquid having at least one carbide forming element under carbide forming conditions.

A further object of my invention is to provide a carbide article forming process wherein a carbonaceous framework or body is infiltered or coated with molten metallic material, machined to the shape desired, and thereafter subjected to carbide forming conditions.

Another object of the present invention is to provide a process of making a substantially pore free carbide article by infiltering and heat treating a molten metallic material in a carbonaceous framework which may be substantially solid carbon, porous carbon skeletons, powdered carbon particles, foamed carbon, carbon batt, carbon fiber cloth, or other carbonaceous materials.

Still another object of the present invention is to provide a process for making carbide articles by infiltering or coating with a molten metallic liquid a carbonaceous framework embodying at least one element whose Gibbs potential at its carbide forming reaction temperature and pressure is greater in the metallic liquid than the Gibbs potential of the same element in any carbide phase or phases possible between all elements included in the system.

Another object of the present invention is to provide novel carbide articles made by a novel process of infiltering or coating a carbonaceous framework with molten metallic liquid embodying at least one carbide forming element at temperatures sufficient to completely or partially react the carbon in the framework with the carbide forming element in the molten metallic liquid.

Other objects and advantages of the present invention will become apparent to those skilled in this art from the appended claims and following description and accompanying drawings (which are photomicrographs of 500× magnification except FIGURE 5 which is 100× magnifications) wherein:

FIGURE 4b shows the impregnated filter graphite of FIGURE 4a after heat treatment; and, FIGURE 5 illustrates an article made in accord with the process of the present invention and having a coating or surface layer of hard, high melting point material.

The framework or skeletons utilized in the preferred embodiment of my novel process are in general any permeable carbonaceous articles having pores intercommunicated by interstices or channels. To infiltrate an article it is necessary that it be permeable, however it is within the contemplation of this invention to employ impervious or only slightly permeable carbonaceous materials when it is desired to form a carbide coating thereon.

Carbon exists in three states, amorphous carbon hereafter referred to merely as carbon, graphite, and diamond. Amorphous carbon may also be partially graphitized or chemically activated, but no new classification is thereby created. The three states differ in crystal structure.

In general it can be stated that if the framework contains the element carbon in any form it may be used to make carbide articles in accord with the present invention. This includes material such as the clay-graphites which have a large proportion of ingredient other than graphite, but which form very hard articles by virtue of the carbide phase developed therein by my process.

An example of a framework which has provided good results is foamed carbon made experimentally by Dow Chemical Company. It has round cellular structure with better than 99% of the cells interconnected by interstices. This material has the advantage of being capable of formation in any degree of porosity desired and attendant with high porosity, with thin cell walls. Porosity of a framework as used herein is defined as the fraction of space occupied by the bulk of the framework piece that is not occupied by the solid framework of the piece. The rate and extent of reaction will be governed to a certain extent by the amount of internal surface made available for contact with the molten metallic liquid. The foam type structure can be of either carbon or graphite. Carbon is cheaper and therefore preferred when the entire framework of carbon is to be reacted with the infiltrant. However, some unreacted graphite framework will provide better strength and lubricating properties than carbon, and as graphite is one of the best known neutron moderators certain of my improved articles (as for example an article which is 45% zirconium carbide, 5% uranium carbide and 50% graphite) are useful in reactor constructions. A carbide article made with foam carbon in accord with my invention which was very hard although the carbon did not go completely into the carbide forming reaction consisted of approximately 30% titanium carbide, 40% of iron-titanium alloy and 10% unreacted carbon. It was made by dipping the foam framework into a bath of iron-titanium melt at 1260° C. and thereafter heating the infiltered article to 1100° C. for 4 hours. A longer time or higher temperature heat treatment would have resulted in a larger percentage of carbide.

Another type of framework material which is utilized in the process of the present invention for making certain of my novel carbide articles is woven carbon or graphite fibers. The fibers can be woven and formed into any shape in which fibrous articles may exist. Fibrous batt may also be used as a framework material.

Certain of the advantages of fibrous framework materials reside in the fact that with the formation of only a small quantity of carbide useful products may be formed. This is in part due to the continuous fiber character of the framework which when reacted acts like a reinforcing rod in a metallic article much like a reinforcing rod in concrete.

Confined discreet particles of carbon may also be used as a framework or skeleton within the scope of my invention and can be made permeable by selection of particle size and degree of compaction dependent upon the amount of porosity and size of interstices required to accept the infiltrant at a practical rate, and the amount of carbon or graphite desired in the final carbide article.

In forming carbide envelopes about carbonaceous materials more or less impermeable to the reacting infiltrant a thin hard carbide coating is produced by reacting the surface carbon or graphite with the molten metallic infiltrant. In this case the framework may be impervious completely or in degrees depending upon the thickness of carbide coating desired in the final coated product. Thus, the molten metallic material may be caused to infilter slightly beyond the framework surface layer before meeting imperviousness or it may be applied as in a bath to a pervious framework which is removed after the desired extent of surface infiltration is attained.

As hereinbefore mentioned my process is operative with many different types of carbon frameworks or skeletons. Products such as National Carbon Co., grade 20, 40, 50, 60 porous filter carbon and, the companion grades of graphite filter material as well as fibrous carbon available from National Carbon Co. and Barneby-Chenney Co. have been successfully used. The major variables other than the physical state of the carbon involved in the selection of a suitable framework are (1) the total port or interstitial volume, (2) the size of the pore or interstitial openings, and (3) the pore or interstitial surface area. The proper pore and interstitial volumes must be chosen in conjunction with the composition of the alloy to be used for infiltration and, will vary markedly depending on the desired final structure and composition.

The larger the total interstitial or pore volume in the original carbon framework or skeleton, the smaller the total amount of carbon present is, and hence the smaller total amount of carbide forming element required to completely react with the carbon. From a knowledge of the density of the molten material and its composition and the composition of the carbide formed, any one skilled in the art can from simple volume and mass considerations calculate the total pore volume required in the original carbon skeleton. By way of example the interstitial volume required to yield a homogeneous body of uranium monocarbide is approximately 70% when the infiltering metal is pure uranium.

The size of the interstitial or pore openings can also be varied over a wide range. The lower limit is dictated by considerations of the rate of infiltration. As the pore size becomes very small the rate of infiltration becomes negligible. For a given pore volume, the pore surface area is of prime importance in determining the total amount of time to be allotted in the subsequent heat treatment for the formation of the metallic carbide. Very small pore size leads to an extended amount of surface area within the compact which leads to shorter reaction time for the formation of a given amount of carbide.

The resulting properties of my improved articles can be varied over wide ranges by the selection of the composition of the infiltrant, the framework pore volume and surface area, and the reaction temperatures. Such variations result primarily in increasing or reducing the ultimate amount of carbide formed in the article and consequently the amount of graphite or carbon which will be left unreacted. These same variations in cases where all of the carbon reacts provides a means of varying the composition of the metallic phase binding the carbide.

It is recognized that an almost infinite number of alloys and carbide systems is possible and that all of these involve simple substitutions for persons skilled in the art. In general, the metallic infiltering materials suitable for my process includes all those containing at least one element whose Gibbs potential at the carbide forming reaction temperature and pressure is greater in the metallic solution than the Gibbs potential of the same element in any carbide phase or phases possible between all elements included in the system. The Gibbs potential is determinable independently from my carbide forming reaction and is suitably defined in "Thermodynamics," by Guggenheim, North Holland Publishing Co., which textbook is hereby incorporated by reference for a detailed explanation and definition of the Gibbs potential.

The composition of the infiltering molten material together with the total port or interstitial volume of the framework determines the final overall composition of the heat treated composite. The infiltering material may contain one or more active carbide formers and may be such that one or all elements comprising it take part in the reaction with the framework. Any element not participating in the reaction remains as a metallic binding phase for the reacted carbide particles. Both the type of active carbide former and its amount can be varied over wide limits. If desired an infiltering alloy can be chosen such that after complete reaction only a carbide phase remains. In this way it is possible to make a solid shaped carbide body which does not have any low melting binder remaining after the final heat treatment.

My improved process is not limited to the formation of a single carbide. It is possible to form solutions of one or more carbides or separate carbide phases. For example, when my process was carried out with an infiltering alloy of 30% Ni; 70% Ti the carbide formed was titanium carbide. The process was also carried out with an alloy of 35% Ni; 55% Ti; 10% Mo which yielded a structure containing both titanium carbide and molybdenum carbide.

In the preferred commercial embodiment of my invention a previously shaped porous or interstitial carbonaceous framework or skeleton is substantially filled with a molten metallic carbide forming material as for example tungsten, titanium, zirconium, etc. or with alloys embodying a carbide forming element and a metal binder material. The framework can be easily pre-shaped by conventional machining methods, or in the case of fibrous materials by pressing.

The framework is held in contact as by dipping in the molten metallic material so that the latter fills the pores under the influence of surface energy (capillary action), aided if necessary by the application of a pressure differential in any well known manner. During the infiltration some reaction between the molten metallic material and the carbon occurs. However, this reaction is very slight unless the temperature of the bath is very high. In most instances a bath temperature only slightly above its melting point will not cause more than a superficial surface reaction to occur, although it is possible in accordance with my invention to carry out at least part of the desired reaction at the time of infiltration by superheating the bath. This adds versatility to my process as will be described.

The infiltration in this embodiment of my invention results in a structure which after cooling shows no detectable porosity when examined under a microscope at 500 magnification. After infiltration and cooling but prior to carrying out the carbide forming reaction, the body can be shaped with conventional cutting tools since it still contains a carbon framework or skeleton. The infiltered bodies in this embodiment have ample strength to be handled during machining. They have been turned, milled, sawed, and drilled without difficulty.

After the machining operation, pieces formed in accordance with this embodiment are heated in a protective atmosphere or vacuum furnace to cause the infiltered metallic material to react with the carbonaceous framework yielding the desired metallic carbide, alone, or in combination with a cementing metal present as a component of the infiltering alloy. Furnaces of the type required for such processing are commonly known in the art.

In another example of my invention, an alloy containing weighed amounts of commercially pure titanium bar stock and water atomized nickel shot was melted. The composition of this alloy was 70% titanium by weight and 30% nickel by weight. The alloy was melted in a graphite crucible in a vacuum furnace operating at a pressure of about 100 microns of mercury. After melting a piece of National Carbon Co. grade 60 porous filter graphite having a porosity of approximately 68% was dipped slowly into the molten metal. The molten metal was held at a temperature of approximately 1200° C. and readily wet the graphite skeleton, completely infiltering it in less than 3 minutes total time. The specimen size was approximately ½" x ½" x 4". After cooling the specimen could easily be cut with a hack saw and other machining operations could be carried out. After shaping pieces of the infiltered material were subjected to a heat treatment in vacuum at 1400° C. for 6 hours. This heat treatment resulted in the formation of fine particles of titanium carbide imbedded in an alloy of nickel shown in FIGURE 4b. The microhardness of the carbide phase was approximately 2700 D.P.H.

The extent to which the reaction occurs can be controlled by controlling the amount of carbide forming element in the infiltered piece. It is possible to use all of the carbon in the carbide reaction; or if desired, to leave some carbon in the structure. Either alternative is useful in differing specific applications For instance in making nuclear fuel elements of uranium, thorium, and zirconium carbide a substantial amount of graphite may be desirable for neutron moderation. Certain applications for electrical contacts such for example as generator brushes and bearing materials also should contain large amounts of retained graphite for its lubricating function and electrical properties.

Figure 1:
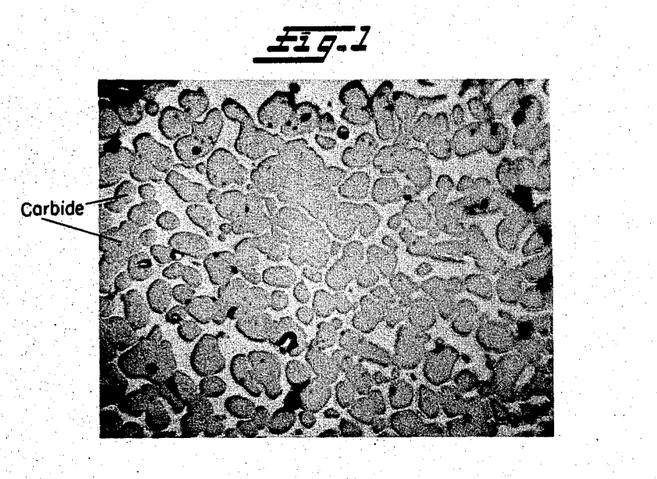
FIGURE 1 shows a charcoal framework infiltered and heat treated with a Ti–Ni alloy in accord with the preferred process of my invention.

The rate of production of carbide is determined by the temperature, metallic material, and the internal and external surface area of the framework. The rate is faster the higher the temperature and the larger the surface area. It is possible to carry out this reaction at a temperature below the melting point of the metal in the pores. However, as will be appreciated by those skilled in this art, faster rates are achievable if the temperature is raised until the metal is at least partially liquid. As an example a porous graphite sample, 68% voids, an average pore size of .0013 inch formed approximately 35% titanium carbide when heated to 1200° C. (alloy liquid) for 4 hours. The infiltering alloy was 70 wt. percent Ti and 30 wt. percent Ni. The same material when heat treated for 4 hours at 925° C., where the metallic phase is solid showed less than 10% titanium carbide formed. The same infiltering alloy was introduced into a charcoal skeleton and held for approximately 30 minutes at 1300° C. The charcoal has a much larger surface area than the filter graphite. The treated charcoal piece showed no unreacted carbon and contained more than 75% titanium carbide particles of very small size as shown in FIGURE 1. The treated piece was extremely hard and could be cut only with great difficulty with a high speed silicon carbide cutting wheel.

A piece with similar hardness resulted from the vanadium carbide containing articles produced in accordance with the conditions set forth in Example B of Table I.

The size and shape of the carbide particles can be controlled somewhat. For achieving small rounded individual particles the reacting phase should completely "wet" the carbide phase, and temperature and time should be kept at a minimum consistent with achieving the desired amount of carbide. The concept of controlling the size and shape of the carbide particles has practical utility when it is desired to improve the mechanical properties as has been shown for conventionally produced cermets by N. M. Parikh in the book "High Temperature Materials," A.I.M.E. Symposium, 1957, published by John Wiley & Sons.

After heat treatment the body is complete except for any final sizing that may be desired.

Figure 2A:
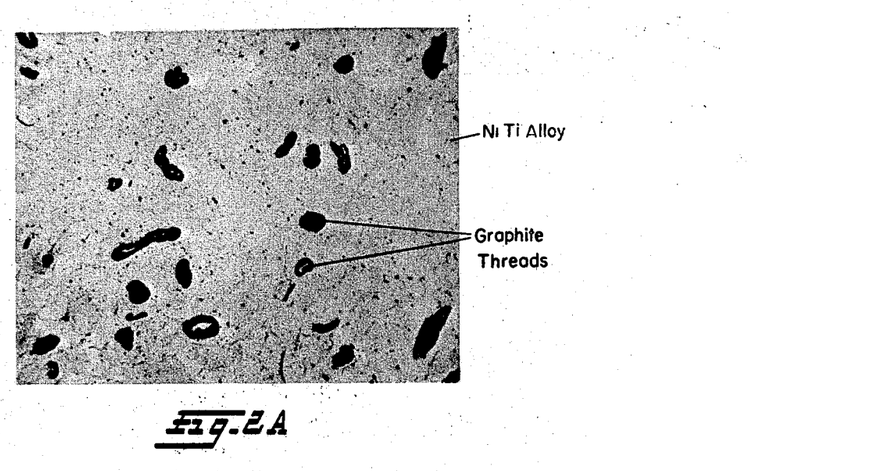
FIGURE 2a shows a graphite batt infiltered with a molten metallic material in accord with the preferred process of my invention.
Figure 2B:
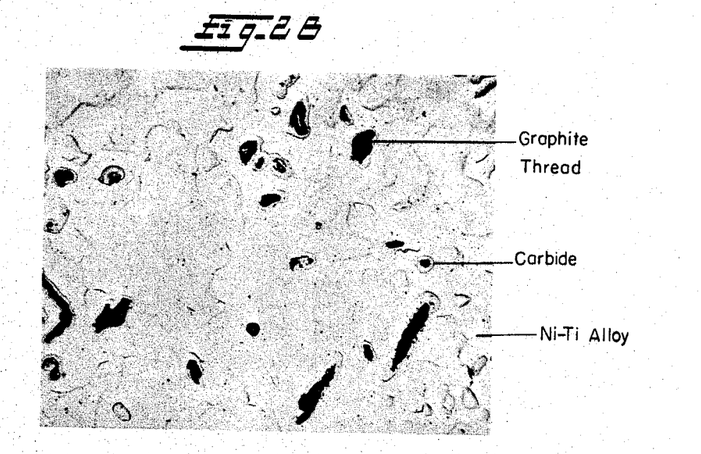
FIGURE 2b shows the early carbide stage of development in the infiltered graphite batt of FIGURE 2a during the heat treatment stage of my process.
Figure 2C:
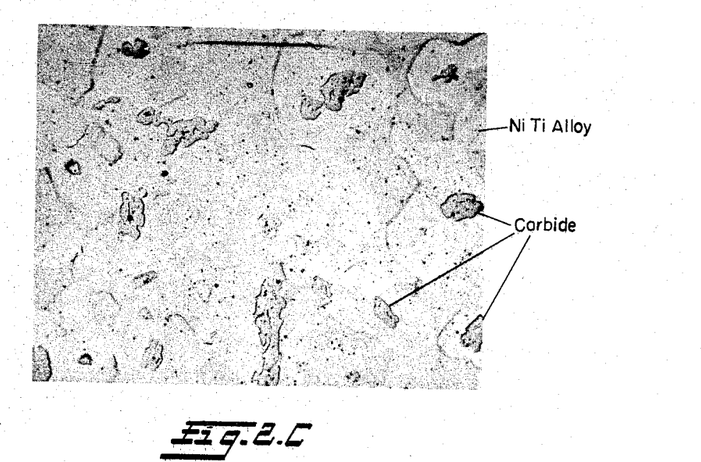
FIGURE 2c shows a carbide article formed in accord with my invention upon further heating of the infiltered carbonaceous framework shown in FIGURE 2b.

Referring to FIGURES 2a, 2b, and 2c, the phases of development of a carbide article made in accord with this embodiment of my invention are shown.

In FIGURE 2a, a graphite batt of the type made by National Carbon Company is shown after it was infiltered in a bath of molten 70% Ti and 30% Ni by weight alloy for approximately 3 minutes at 1200° C. in vacuum. The arrows in FIGURE 2a point to a few of the graphite threads which form the batt with relatively large openings in the order of .001" between threads. The light appearing material in areas surrounding the batt threads is Ti–Ni alloy.

FIGURE 2b shows the graphite batt of FIGURE 2b after it has been treated for approximately 16 hours at 925° C. The large, black areas are graphite threads. The gray ring-like areas indicated by the arrows are areas of carbide formation as it begins to form.

In FIGURE 2c the carbide forming reaction has substantially completely reacted the graphite after 40 hours of heating at 980° C., leaving gray carbide particles, a few of which are indicated by arrows for identification, in a Ti–Ni alloy binder matrix. The heat treatment of this example was carried out in vacuum. The finished article contained titanium carbide with a melting point of more than 3100° C., a hardness in the order of 2700 D.P.H.

Figure 3A:
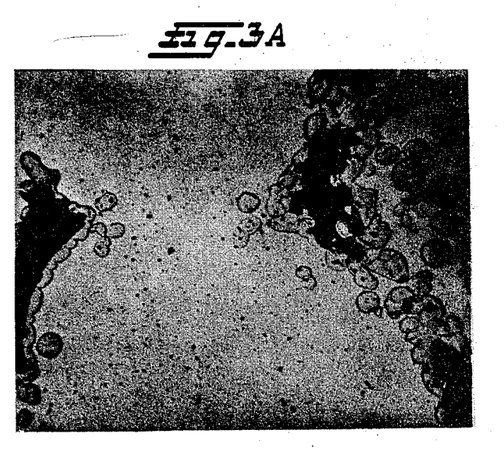
FIGURE 3a is a photomicrograph of a piece of foamed carbon as infiltered.

In FIGURE 3a, a foamed carbon framework is shown after infiltration with 70% Ti–30% Ni alloy for approximately 5 minutes at 1200° C. in vacuum. The large black areas are pieces of the framework which are surrounded by grey globular appearing areas of carbide which formed during infiltration. The carbide is not sufficiently formed to preclude conventional machining of the article at this stage. The white matrix area is Ni–Ti alloy and many of the tiny black objects in the matrix are small particles of titanium carbide.

Figure 3B:
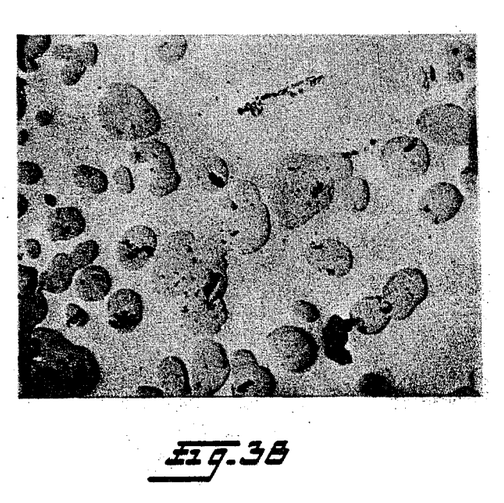
FIGURE 3b shows the infiltered foamed carbon shown in FIGURE 3a after heat treatment in accord with my invention.

Thereafter as shown in FIGURE 3b the infiltered framework was subjected to carbide forming conditions at a temperature of about 1315° C. for 11 hours. The large grey globular carbide areas show the extent of carbide formation in the Ni–Ti alloy binder matrix. The carbonaceous material is substantially completely reacted and the finished article contained titanium carbide with a melting point of more than 3100° C. and a hardness in the order of 2700 D.P.H.

Figure 4A:
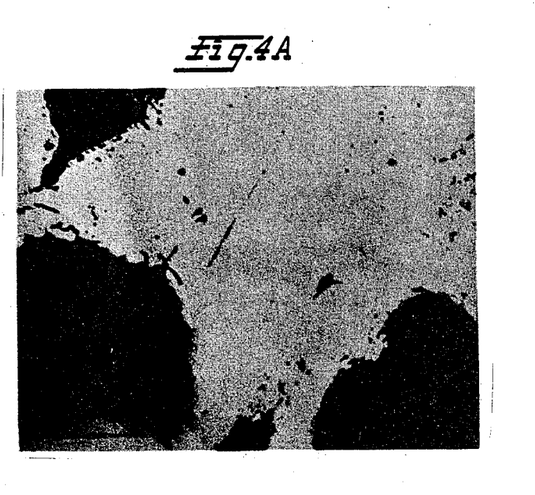
FIGURE 4a shows a piece of National Carbon Company filter graphite as infiltered with a molten metallic material.

In the example shown in FIGURE 4a, a piece of filter graphite #60 made by National Carbon Company was infiltered by dipping in a molten bath of 70% Ti–30% Ni at about 1100° C. and in vacuum. The large black areas are graphite with small fringe areas of carbide as indicated by the arrows. The white area is again Ti–Ni alloy.

Figure 4B:
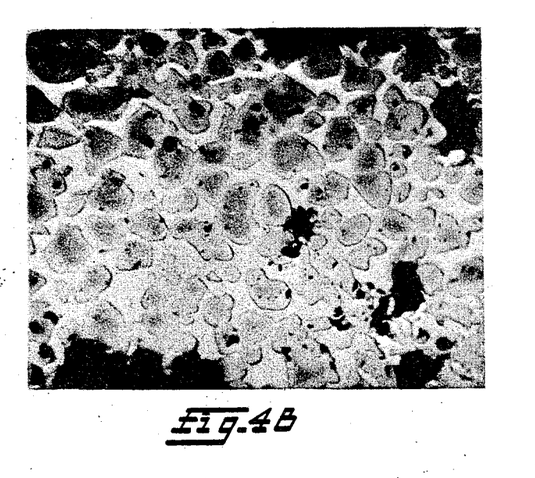

FIGURE 4b shows Ti–Ni infiltered graphite #60 after being heated to 1400° C. for 6 hours in vacuum. A large proportion of the article (grey areas) consists of carbide particles having a Ti–Ni alloy matrix. The large black areas are fragments of unreacted graphite.

In all cases the hardness of the carbide formed is approximately the same as carbide formed in more conventional ways. The hardness of the total body is dependent on the amount of carbide present as well as the amount present of the much softer metallic binder phases or unreacted graphite.

Figure 5:
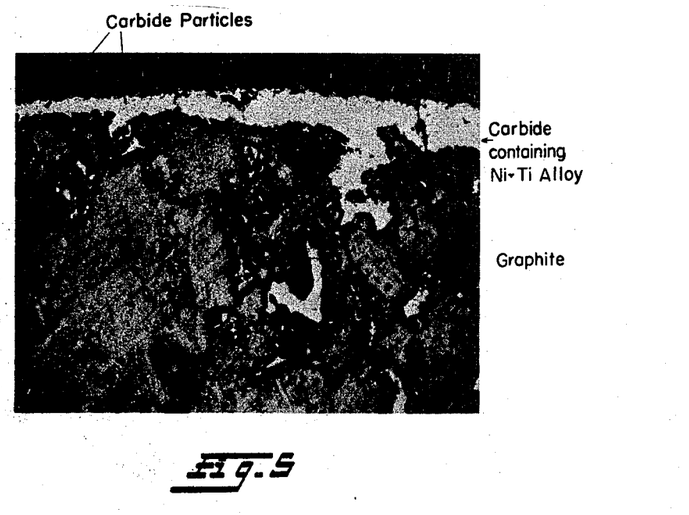

In FIGURE 5 an article made in accord with the present invention is shown having a central core of a commercial graphite and a hard outer carbide containing layer. The article was produced by dipping a graphite framework into molten 70 percent Ti–30 percent Ni alloy. Infiltration for 20 minutes resulted in impregnation of the surface of the framework which was thereafter heat treated in vacuum environment at 1400° C. for 20 minutes. Such hard coated articles are cheaply made and have practical utility when used as rolling electrical contacts. The coated articles are slowly cooled and the coating is pore free.

Where an infiltrating alloy is used the composition thereof determines its melting point. It is possible to devise many useful infiltering alloys containing at least one carbide forming element whose melting points are very low compared with the metallic carbides or even with the binder metal which remains after reaction. By way of example, an alloy containing 71 parts by weight titanium and 29 by weight nickel melts at approximately 955° C. has been used to infilter a graphite skeleton of approximately 68% voids with an infiltering temperature of approximately 1020° C. This temperature is well below the melting point of either titanium (1720° C.) or nickel (1453° C.). Subsequent reaction of this alloy with the skeleton at 1100° C. produces titanium carbide particles distributed in a matrix of a nickel-titanium alloy. By means of this phase of my invention such a composite body can be made without heating above the melting point of nickel. The avoidance of high temperature processing and its attendant difficulties are an obvious advantage of my process. While a limitless combination of compositions is possible, certain compositions are more conveniently used than others. These compositions are those such as the Ti–Ni alloy which contain rather large amounts of the reacting metal but still retain low melting points.

It is possible to utilize in my process infiltrating alloys made wholly or by modification of commercially available materials. For example, I have utilized commercially available alloys, among them an iron-titanium alloy whose composition is approximately 70 parts by weight titanium, 29 parts by weight iron currently manufactured by the Electromet Corporation to form a novel titanium carbide containing article useful as a sleeve bearing material when suitably shaped and heat treated.

The following table of examples are illustrative of various molten infiltrating materials which may be used in my process with various framework and of various procedural variations which may be employed. Carbonaceous frameworks may be initially shaped to desired configuration by conventional machining processes and carbon fiber frameworks can be preformed by pressing into rough shape. After machining to the shape desired, for example, to the shape of a cutting tool, or other tool wherein it is known that particularly hard materials are preferably employed, the heat treatment forms the carbide and the hard article is formed.

The tables of examples are divided according to the type of framework used for convenience. In each example

*Table I–A*

[The carbonaceous framework used was National Carbon filter graphite, pore size .0013 inch, volume 68% except in sample F where the pore volume was 53%]

|  | A | B | C | D | E | F | G |
|---|---|---|---|---|---|---|---|
| Infiltering alloy, percent by wt. | 84% Zr / 16% Fe | 47.5% V / 52.5% Ni | 72% Ti / 28% Co | 70% Ti / 30% Ni | 67.2% Ti / .12% B / 29.4% Fe / 3.4% Al | 70% Ti / 30% Ni | 70% Ti / 30% Ni |
| Carbide forming elements | Zr | V | Ti | Ti | Ti, B, Fe | Ti | Ti |
| Alloy M.P., °C | 980 | 1,200 | 1,030 | 943 | 1,080 | 943 | 943 |
| Infiltration: |  |  |  |  |  |  |  |
| Temp., °C | 1,260 | 1,290 | 1,200 | 1,100 | 1,150 | 1,100 | 1,100 |
| Atmosphere | Vac | Vac | Vac | Vac | Vac | Vac | Vac |
| Time, min | 10 | 10 | 10 | 1 | 1 | 1 | 1 |
| Flux | None | None | None | None | None | None | None |
| Heat treatment: |  |  |  |  |  |  |  |
| Atmosphere | N | N | Vac | Vac | Vac | Vac | Vac |
| Time, hrs | O | O | 12 | 6.5 | 4 | 4 | 3 |
| Temp., °C | N | N | 1,230 | 1,450 | 1,400 | 1,400 | 1,330 |
| State | E | E | Liquid | Liquid | Liquid | Liquid | Liquid |
| Results: |  |  |  |  |  |  |  |
| Approx. D.P.H. hardness of carbide | 2,200 | 2,500 | 2,700 | 2,700 | 2,700 | 2,700 | 2,700 |
| Approx. percent carbide formed | 10 | 80 | 10 | 40 | 50 | 45 | 20 | is given the framework, alloy, the infiltration and heat treatment conditions, the hardness of the resulting carbide which is normally the same as that of a carbide formed in previously known processes, and the approximate amount of carbide formed in the articles.

sired density and confined in a graphite cylinder crucible which is then dipped into the molten alloy, causing the metal to flow through a small hole in the cylinder and infilter the carbon particle compact.

The framework for sample B was powdered graphite particles ranging in size from .001 to .01 inch.

Table I-B
[Framework: National Carbon Co. filter graphite, pore size .0013 inch, porosity 68%]

|  | H | I | J | K | L | M | N |
|---|---|---|---|---|---|---|---|
| Infiltering alloy, percent by weight. | 70% Ti 10% Mo Bal. Ni | 70% Ti 10% Mo Bal. Ni | 70% Ti 10% Mo Bal. Ni | 70% Ti 10% Mo Bal. Ni | 70% Ti 10% Mo Bal. Ni | 7.1% Mn 46.8% Ti 30.5% Ni 14.3% Al | 7.1% Mn 46.8% Ti 30.5% Ni 14.3% Al |
| Carbide forming elements. | Ti, Mo | Ti, Mo | Ti, Mo | Ti, Mo | Ti, Mo | Mn, Ti | Mn, Ti |
| Alloy M.P., °C | [1] 943 | | | | | [1] 1100 | |
| Infiltration: | | | | | | | |
| Temp., °C | 1,100 | 1,100 | 1,100 | 1,100 | 1,100 | 1,315 | 1,315 |
| Atmosphere | Vac | Vac | Vac | Vac | Vac | Vac | Vac |
| Time, min | 3 | 3 | 3 | 3 | 3 | 2 | 2 |
| Flux | None | None | None | None | None | None | None |
| Heat treatment: | | | | | | | |
| Atmosphere | Vac | Vac | Vac | Vac | Vac | He | Air |
| Time, hrs | 36 | 16 | 4 | 12 | 4 | 48 | 48 |
| Temp., °C | 950 | 1,150 | 1,230 | 1,230 | 1,300 | 927 | 927 |
| State | Liquid | Liquid | Liquid | Liquid | Liquid | Liquid | Liquid |
| Approx. D.P.H. carbide hardness | 2,800 | 2,800 | 2,800 | 2,800 | 2,800 | 2,700 | 2,700 |
| Approx. percent carbide formed | 15 | 25 | 20 | 25 | 30 | 25 | 25 |

[1] Approximate.

Table II
[The carbonaceous framework used was graphite batt (fibers .0002 inch thick) made by the National Carbon Company]

|  | A | B | C |
|---|---|---|---|
| Infiltering alloy, percent by weight. | 70% Ti 30% Ni | 70% Ti 30% Ni | 70% Ti 30% Ni |
| Carbide forming element(s) | Ti | Ti | Ti |
| Alloy M.P., °C | 943 | 943 | 943 |
| Infiltration: | | | |
| Temp., °C | 1,100–1,200 | 1,100–1,200 | 1,100–1,200 |
| Atmosphere | Vac | Vac | Vac |
| Time, min | 1 | 1 | 1 |
| Flux | None | None | None |
| Heat treatment: | | | |
| Atmosphere | Vac | Vac | Vac |
| Time, hrs | 8 | 64 | 40 |
| Temp., °C | 930 | 930 | 982 |
| State | Solid | Solid | [1] |
| Approx. D.P.H. hardness of carbide | 2,700 | 2,700 | 2,700 |
| Approx. percent carbide formed | [2] | [3] | 80 |

[1] Just into liquid.
[2] Most graphite unreacted.
[3] Increased amount carbide formed.

Table III

|  | A | B |
|---|---|---|
| Infiltering alloy, percent by weight | 50% Ti 50% Cu | 70% Ti 30% Ni |
| Framework porosity, percent | 50 | 80 |
| Carbide forming element(s) | Ti | Ti |
| Alloy M.P., °C | 960 | 943 |
| Infiltration: | | |
| Temp., °C | 1,200 | 1,100 |
| Atmosphere | Air | Vac |
| Time, min | 10 | 1 |
| Flux | NaCl | None |
| Heat treatment: | | |
| Atmosphere | None | Vac |
| Time, hrs | None | 10 |
| Temp., °C | None | 1,315 |
| State | None | Liquid |
| Approx. percent carbide formed | | 35 |
| Approx. D.P.H. hardness of carbide | 2,700 | 2,700 |

Framework (sample A) powdered carbon particles (—200 mesh): The particles are compacted to the de-

Table IV
[Framework: Foam carbon made by Dow Chemical Co., cells .004 in. 96% porosity]

|  | A | B | C | D |
|---|---|---|---|---|
| Infiltering alloy | 67.2% Ti .12% B 29.4% Fe 3.4% Al | [1] | 70% Ti 30% Ni | 70% Ti 30% Ni |
| Carbide forming elements | Ti, B, Fe | [1] | Ti | Ti |
| Alloy M.P., °C | 1,080 | 1,080 | 943 | 943 |
| Infiltration: | | | | |
| Temp., °C | 1,150 | 1,150 | 1,100 | 1,100 |
| Atmosphere | [2] Vac | [3] | [2] Vac | [4] |
| Time, min | 5 | 5 | 10 | 10 |
| Flux | None | None | None | None |
| Heat treatment: | | | | |
| Atmosphere | Vac | Vac | Vac | Vac |
| Time, hrs | 24 | 48 | 11 | 24 |
| Temp., °C | 1,315 | 1,315 | 1,315 | 1,315 |
| State | Liquid | Liquid | Liquid | Liquid |
| Approx. percent carbide formed | 45 | 50 | 40 | 45 |
| Approx. D.P.H. hardness of carbide | 2,700 | 2,700 | 2,700 | 2,700 |

[1] Same as A. [2] 100 microns. [3] Same as in A. [4] Same in as C.

Table V
[Framework: National Carbon Co. graphite felt, fiber size .0002 inch]

|  | A | B |
|---|---|---|
| Infiltering alloy, percent by weight | 67.2% Ti .12% B 29.4% Fe 3.4% Al | 70% Ti 30% Ni |
| Carbide forming elements | Ti, B, Fe | Ti |
| Alloy M.P., °C | 1,080 | 943 |
| Infiltration: | | |
| Temp. °C | 1,100 | 1,100 |
| Atmosphere | [1] Vac | Vac |
| Time, min | 5 | 1 |
| Flux | None | None |
| Heat treatment: | | |
| Atmosphere | Vac | Vac |
| Time, hrs | 15 | 4 |
| Temp., °C | 1,120 | 930 |
| State | Liquid | Solid |
| Approx. D.P.H. hardness of carbide | 2,700 | 2,700 |
| Approx. percent carbide formed | 50 | 20 |

[1] 100 microns.

Table VI

[Framework: Charcoal, 95% porosity]

|  | A | B |
|---|---|---|
| Infiltering alloy, percent by weight | 70% Ti 30% Ni | 70% Ti 30% Ni |
| Carbide forming element(s) | Ti | Ti |
| Alloy M.P., °C | 943 | 943 |
| Infiltration: | | |
| Temp., °C | 1,100 | 1,100 |
| Atmosphere | Vac | Vac |
| Time, min | 10 | 2 |
| Flux | None | None |
| Heat Treatment: | | |
| Atmosphere | Vac | None |
| Time, hrs | 10 | None |
| Temp., °C | 1,315 | None |
| State | Liquid | None |
| Approx. D.P.H. hardness of carbide formed | 2,700 | 2,700 |
| Approx. percent carbide formed | 80 | 75 |

The infiltration step of my process can be carried out in a number of ways and in a variety of different apparatus. One such apparatus is shown and described in "High Temperature Technology," p. 269, John Wiley, 1956. Since many infiltering materials are very prone to oxidize it may be necessary to provide some protection to avoid excessive oxidation and slagging which can cause difficulties in the infiltration step. Any slag which forms on the infiltering material must be kept from plugging the pores or interstices of the carbonaceous framework to prevent clogging, loss of permeability, and consequent inadequate infiltration. While it is possible to mechanically remove the slag in a region where the framework is to be contacted with the melts, it is usually necessary to provide a flux cover on top of the molten alloy to help prevent oxidation when infiltering from a molten alloy held in air. I have discovered that the flux also aids in the wetting of the carbonaceous framework or skeleton. The flux must have a melting point below the desired infiltration temperature and a low volatility. I have successfully utilized a mixture of 50 wt. percent sodium and 50 wt. percent potassium chlorides, as well as anhydrous barium chloride, to protect alloys of copper-titanium, nickel-titanium and iron-titanium. Another example of a flux which I have used with success is commercially available cryolite which protected an alloy containing approximately 70% Ti and 30% Fe.

The use of a protective flux covering may be avoided by carrying out the infiltration in a vacuum furnace or a furnace equipped to operate with a protective gas environment. This type of furnace is commonly used in the current art for melting and heat treatment. Successful infiltration of a large number of alloys has been achieved at an operating vacuum of approximately 10 microns (.001 cm. Hg) as illustrated in the examples set out in the above tables such as those in Table I-A. In addition inert atmospheres composed of commercial grades of argon and/or helium have been used with success for the infiltration of 70 wt. percent Fe-30 wt. percent Ti into filter graphite.

The controlling principle of infiltration of a solid carbonaceous framework with a liquid is well known, and I have discovered that it is applicable to my compacted powder and compacted fiber interstitial frameworks as well. In general it is possible to infilter any porous structure with any liquid in any given environment when the total Helmholtz free energy (see for example Guggenheim, "Thermodynamics") of the system decreases upon infiltration. There is usually not enough available data to calculate the total Helmholtz free energy change. However it is usually sufficient for infiltration to take place that the molten alloy "wet" the solid framework (see Udin, Funk and Wulff, "Welding Metallurgy," Wiley, 1954). This condition of wetting imposes very little restriction on my process since all of my infiltering compositions are such that they are capable of reacting with the framework. This usually results in wetting of the solid by the liquid, which may however, be prevented by unwanted surface reactions occurring between the liquid alloy and/or the framework and constituents of the atmosphere. This situation is particularly prone to occur when the infiltering alloy contains a sizable percentage of aluminum. In such difficult cases fluxes can generally be used to bring about wetting.

The infiltration can be carried out at a rate dictated by the normal capillary adsorption of the liquid metal or if desired to save time on larger pieces a faster rate can be achieved by the application of a suitable pressure differential, thereby forcing the molten liquid into the framework or skeleton. For most compositions and small samples a pressure differential is not required to achieve rapid enough infiltration. For large pieces the application of a pressure differential may be necessary in order to minimize the time required for complete infiltration. I have devised a number of systems for impregnation under pressure of various materials. In general the size of the differential is dependent upon the size of the pore structure and the infiltrant as stated above and can be varied to obtain the desired amount of infiltration if less than complete infiltration is desired.

The rates of reaction are faster when the composition and temperature are such that a considerable amount of liquid phase remains present at all times in the interstices and pores of the carbon framework or skeleton. As the reacting metallic phase becomes depleted in the element forming the carbide phase the possibility exists for the formation of other solid intermetallic phases which can act to slow down the reaction. For example, an infiltrant alloy which was initially molten may at the same temperature, due to depletion become partly or completely solid.

When the carbide forming reaction is carried out in a separate step it is usually desirable to provide a protective atmosphere such that the active carbide forming metal is not used to form oxide in preference to carbide.

If the reaction is carried out in the liquid region all machined surfaces of the infiltered structure will become wet with a thin liquid layer. This liquid layer provides a method for joining pieces. Two pieces machined smooth can be joined by placing them lightly together and heating until the infiltering alloy becomes molten and flows between them. As the carbide reaction takes place the pieces become joined together.

The alloy which remains after the carbide forming reaction has been carried to completion or has been caused to proceed at a negligible rate can be treated in a variety of conventional ways. Those skilled in the art are aware of many varied heat treatments for any given alloy system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for making an article having at least an outer region of substantial thickness containing at least one carbide, comprising the steps of:
   (a) infiltering a permeable framework which is essentially elemental carbon with a liquid metallic material comprising at least one element capable of chemically combining with the framework material to form at least one carbide and at least one additional element capable of depressing the melting point of the infiltrant to a temperature below that of said one carbide forming element, said infiltration being carried out entirely at a temperature below that of appreciable vaporization of the infiltrant, whereby said material remains in the liquid phase throughout the infiltration of said framework;

(b) continuing said infiltration until substantially all of the voids in said framework are substantially completely filled to at least a depth sufficient to permit removal of an outer portion of said article of substantial thickness without destroying more than a minor outer portion of the infiltered region; and (c) subjecting the infiltered framework to a pressure and temperature above those at which elemental carbon chemically combines with said element to form a carbide of said element, whereby at least part of the infiltered portion of said framework is converted to at least one carbide.

2. A process for making an article having at least an outer region of substantial thickness containing at least one carbide, comprising the steps of:

(a) infiltering a permeable framework which is essentially elemental carbon with a liquid metallic material comprising at least one element capable of chemically combining with the framework material to form at least one carbide and at least one additional element capable of depressing the melting point of the infiltrant to a temperature below that of said one element to at least a depth sufficient to permit removal of an outer portion of said article of substantial thickness without destroying more than a minor outer portion of the infiltered region, said infiltration being carried out entirely at a temperature below the carbide forming temperature of any carbide forming element in said metallic material and below the temperature of appreciable vaporization of the infiltrant, whereby said metallic material remains in the liquid phase throughout the infiltration of said framework and there is substantially no chemical reaction between said framework and any carbide forming element in the metallic material during the infiltration of said framework; and thereafter (b) subjecting the infiltered framework to a pressure and temperature above that at which elemental carbon chemically combines with an element in said metallic material to form a carbide of said element, whereby at least a portion of the infiltered elemental carbon is converted to at least one carbide.

3. The process as defined in claim 1, wherein said infiltration is continued until substantially all of the voids throughout said framework are substantially completely filled with said metallic material, whereby at least one carbide is formed throughout said framework.

4. A process for making an article having at least an outer region of substantial thickness containing at least one carbide, comprising the steps of:

(a) infiltering a permeable framework which is essentially elemental carbon with a liquid metallic material comprising at least one element capable of chemically combining with the framework material to form at least one carbide and at least one additional element capable of depressing the melting point of the infiltrant to a temperature below the melting point of said one carbide, said infiltration being carried out at a temperature below the carbide forming temperature of any carbide forming element in said metallic material and below the temperature of appreciable vaporization of the infiltrant, whereby said metallic material remains in the liquid phase throughout the infiltration of said framework;

(b) continuing said infiltration until substantially all of the voids in said framework are substantially completely filled with said metallic material to at least a depth sufficient to permit removal of an outer portion of said article of substantial thickness without destroying more than a minor outer portion of the infiltered region and until there has been deposited in the voids in the infiltered portion of said framework a substantially greater than stoichiometric amount of metallic material; and (c) subjecting the infiltered framework to a pressure and temperature above that at which elemental carbon chemically combines with said element to convert at least a portion of said framework to carbide, whereby said article includes particles of at least one carbide cemented together by unreacted metallic material.

5. As an article of manufacture, a composite body comprising a continuous framework consisting essentially of elemental carbon with substantially all of the voids therein substantially completely filled with an impregnated metallic material comprising at least one element capable of chemically combining with the framework material to form at least one carbide to at least a depth sufficient to permit removal of an outer portion of said article of substantial thickness without destroying more than a minor outer portion of the impregnated region, said framework material being substantially unreacted with any carbide forming element in said metallic material.

6. A process for making an article having at least an outer region of substantial thickness containing at least one carbide, comprising the steps of:

(a) infiltering a permeable framework which is essentially elemental carbon with a liquid metallic material comprising at least one carbide and at least one additional element capable of binding together carbide formed by the reaction of said carbide forming element and the carbon in said framework;

(b) continuing said infiltration until substantially all of the voids in said framework are substantially completely filled to at least a depth sufficient to permit removal of an outer portion of said article of substantial thickness without destroying more than a minor outer portion of the infiltered region; and (c) subjecting the infiltered framework to a pressure and temperature above those at which elemental carbon chemically combines with said element to form a carbide of said element, whereby at least part of the infiltered portion of said framework is converted to at least one carbide and said carbide is cemented by said metallic material.

7. A process for making an article having at least an outer region of substantial thickness containing at least one carbide, comprising the steps of:

(a) infiltering a permeable framework which is essentially elemental carbon by contacting said framework with a liquid metallic material comprising at least one element capable of chemically combining with the framework material to form at least one carbide and selected from the group consisting of aluminum, uranium, manganese, beryllium, and thorium, said material being of a constituency capable of wetting the framework at a temperature below that at which said element chemically combines with elemental carbon at an appreciable rate;

(b) continuing the infiltration until said framework is impregnated to at least a depth sufficient to permit removal of an outer portion of said article of substantial thickness without destroying more than a minor outer portion of the infiltered region;

(c) maintaining the infiltrant and framework at a temperature below the temperature of appreciable vaporization of the infiltrant, whereby said metallic material remains in the liquid phase throughout the infiltration of said framework; and (d) subjecting the infiltered framework to a pressure and temperature above that at which elemental carbon chemically combines with an element in said metallic material to form a carbide of said element, whereby at least a portion of the infiltered elemental carbon is converted to at least one carbide.

8. The process as defined in claim 1, wherein a framework consisting essentially of elemental boron is substituted for the carbon framework, the liquid metallic material comprises at least one element capable of chemically combining with the framework to form at least one boride, and the infiltered framework is subjected to a temperature and pressure above that at which elemental boron chemically combines with an element in said material to form a boride of said element, whereby at least a portion of the infiltered framework is converted to at least one boride.

9. The process as defined in claim 1, wherein a framework consisting essentially of elemental silicon is substituted for the carbon framework, the liquid metallic material comprises at least one element capable of chemically combining with the framework to form at least one silicide, and the infiltered framework is subjected to a temperature and pressure above that at which elemental silicon chemically combines with an element in said material to form a silicide of said element, whereby at least a portion of the infiltered framework is converted to at least one silicide.

10. An article of manufacture as defined in claim 5, wherein boron is substituted for the carbon in the framework and the liquid metallic material comprises at least one element capable of chemically combining with boron to form at least one boride.

11. An article of manufacture as defined in claim 5, wherein silicon is substituted for the carbon in the framework and the liquid metallic material comprises at least one element capable of chemically combining with silicon to form at least one silicide.

12. As an article of manufacture, a composite body comprising a permeable continuous framework consisting essentially of elemental carbon with substantially all of the voids therein substantially completely filled with a deposit of a metallic material comprising at least one element capable of chemically combining with the framework material to form at least one carbide, said framework material being substantially unreacted with any carbide forming element in said metallic material, whereby said article may be shaped to a final configuration and thereafter subjected to carbide forming pressure and temperature conditions to effect a chemical reaction between at least one carbide forming element in said metallic material and the carbon of said framework.

13. The process as defined in claim 1, wherein said metallic material comprises at least one carbide forming element selected from the group consisting of boron, iron, manganese, molybdenum, titanium, vanadium, and zirconium.

14. The process as defined in claim 1, wherein the infiltered metallic material comprises a plurality of phase forming metallic elements and is capable of chemically combining with said framework material to form a plurality of carbides.

15. The process as defined in claim 1, wherein the infiltered metallic material comprises a plurality of carbide forming metallic ingredients and is incapable of chemically combining with said framework to form more than a single carbide.

16. The process as defined in claim 1, wherein the infiltered metallic material comprises a single carbide forming metallic element and is capable of chemically combining with the framework material to form a plurality of carbides.

17. The process as defined in claim 1, wherein the infiltered metallic material comprises a single carbide forming metallic element and is incapable of chemically combining with said framework material to form more than a single carbide.

18. The process as defined in claim 1, wherein said infiltration is carried out at substantially atmospheric pressure.

19. A process as defined in claim 1 wherein said infiltration is carried out in a protective environment.

20. A process as defined in claim 1 wherein said liquid metallic material has a flux added thereto prior to infiltration.

References Cited by the Examiner

UNITED STATES PATENTS

| 2,431,326 | 11/1947 | Heyroth | 29—95 |
| 2,612,443 | 9/1952 | Goetzel et al. | 22—202 |
| 2,636,856 | 4/1953 | Suggs | 117—228 X |
| 2,685,543 | 8/1954 | Sindeband. | |
| 2,691,605 | 10/1954 | Hediger | 117—118 X |
| 2,863,211 | 12/1958 | Wellman | 29—182.5 X |
| 2,899,338 | 8/1959 | Goetzel et al. | 117—118 |
| 2,910,379 | 10/1959 | Gurmsky | 117—118 X |
| 2,929,741 | 3/1960 | Steinburg | 117—118 X |
| 2,972,556 | 2/1961 | Vrahiotes et al. | 117—118 X |
| 3,031,340 | 4/1962 | Girardot | 75—201 X |

DAVID L. RECK, *Primary Examiner.*

RICHARD D. NEVIUS, ROGER L. CAMPBELL,
*Examiners.*

UNITED STATES PATENT OFFICE
CERTIFICATE OF CORRECTION

Patent No. 3,235,346                        February 15, 1966

Edward E. Hucke

It is hereby certified that error appears in the above numbered patent requiring correction and that the said Letters Patent should read as corrected below.

Column 5, line 22, for "some" read -- since --; column 6, lines 4 and 61, for "port", each occurrence, read -- pore --; column 8, line 5, after "applications" insert a period; column 16, line 29, after "carbide" insert -- forming element --; column 18, line 42, for "Gurmsky" read -- Gurinsky --.

Signed and sealed this 28th day of February 1967.

(SEAL)
Attest:

RNEST W. SWIDER                              EDWARD J. BRENNER
ttesting Officer                                    Commissioner of Patents